(12) United States Patent
Hung et al.

(10) Patent No.: US 10,354,510 B2
(45) Date of Patent: Jul. 16, 2019

(54) DETECTION SYSTEM FOR DETECTING MOVING OBJECT CROSSING BORDER AND METHOD THEREOF

(71) Applicant: Harbinger Technology Corporation, New Taipei (TW)

(72) Inventors: Yuan-Tung Hung, New Taipei (TW); Der-Hsin Chou, New Taipei (TW); Kou-Sou Huang, New Taipei (TW); Yu-Hsien Lin, New Taipei (TW)

(73) Assignee: Harbinger Technology Corporation, New Taipei (TW)

( * ) Notice: Subject to any disclaimer, the term of this patent is extended or adjusted under 35 U.S.C. 154(b) by 0 days.

(21) Appl. No.: 15/797,826

(22) Filed: Oct. 30, 2017

(65) Prior Publication Data
US 2019/0130721 A1 May 2, 2019

(51) Int. Cl.
*B60P 3/04* (2006.01)
*B60Q 9/00* (2006.01)
(Continued)

(52) U.S. Cl.
CPC ........... *G08B 21/0261* (2013.01); *B60Q 9/00* (2013.01); *B63C 9/0005* (2013.01);
(Continued)

(58) Field of Classification Search
CPC .......... G01V 3/08; G01V 3/15; G08B 21/088; G08B 13/126; G08B 13/14; G08B 13/1427; G08B 13/2402; G08B 13/2417; G08B 13/2462; G08B 19/00; G08B 21/0211; G08B 21/0222; G08B 21/0227; G08B 21/023; G08B 21/0247; G08B 21/028; G08B 21/0283; G08B 21/0286; G08B 21/0288; G08B 21/0294; G08B 21/0453; G08B 21/18; G08B 25/003; G08B 25/007; G08B 25/016; G08B 25/10; G08B 26/007
(Continued)

(56) References Cited

U.S. PATENT DOCUMENTS

| | | | | |
|---|---|---|---|---|
| 5,021,765 A | * | 6/1991 | Morgan | ............... B63C 9/0005 340/539.23 |
| 7,920,066 B2 | | 4/2011 | Troxler | |

(Continued)

FOREIGN PATENT DOCUMENTS

TW 200849152 A 12/2008

*Primary Examiner* — Emily C Terrell
(74) *Attorney, Agent, or Firm* — Muncy, Geissler, Olds & Lowe, P.C.

(57) ABSTRACT

A detection system for detecting a moving object crossing a border includes a sense device and a positioning device. The sense device is disposed on a moving object and has a first position module. The first position module generates a first position signal based on the sense device. The positioning device is signally connected with the sense device and has a calculating module, a second position module, a detecting module, and a warning module. The positioning device receives the first position signal. The calculating module sets a border. The second position module generates a second position signal based on the positioning device. The detecting module determines if the sense device is out of the border based on the first position signal and the second position signal. The warning module sends out a warning signal.

6 Claims, 5 Drawing Sheets

(51) Int. Cl.
*B63C 9/00* (2006.01)
*G08B 21/02* (2006.01)
(52) U.S. Cl.
CPC ............ *G08B 21/0277* (2013.01); *B60P 3/04* (2013.01); *B63C 2009/0017* (2013.01)
(58) Field of Classification Search
USPC .......................................... 340/686.1, 573.1
See application file for complete search history.

(56) References Cited

U.S. PATENT DOCUMENTS

| | | | |
|---|---|---|---|
| 2002/0021231 A1* | 2/2002 | Schlager | B63C 9/0005 340/984 |
| 2005/0114015 A1* | 5/2005 | Motoyama | G01S 5/0027 701/484 |
| 2008/0174484 A1* | 7/2008 | Katz | G01S 19/17 342/357.31 |
| 2012/0229282 A1* | 9/2012 | Zagami | G08B 13/183 340/573.6 |
| 2012/0244879 A1* | 9/2012 | Freathy | G07C 9/00111 455/456.1 |
| 2016/0275769 A1* | 9/2016 | McIntosh | G08B 13/2414 |
| 2018/0215452 A1* | 8/2018 | Zielonka | B63C 9/0005 |

* cited by examiner

DETECTION SYSTEM FOR DETECTING MOVING OBJECT CROSSING BORDER AND METHOD THEREOF

BACKGROUND OF THE INVENTION

1. Field of the Invention

The present invention relates to detection systems, and more particularly, to a detection system for detecting a moving object crossing a border.

2. Description of the Related Art

A conventional position correction device with alarm is disclosed by U.S. Pat. No. 7,920,066, wherein the border coordinates of a detection area is saved in a monitoring device thereof. A positioning device is worn on an animal to-be-monitored. By use of GPS, positions of the animals wearing the positioning device are detected, such that when the animal moves close to the predetermined border, an alarm is triggered.

However, the monitoring area and border abovementioned are fixed. In other words, the monitoring function is only carried out upon a fixed area. Therefore, such monitoring device is not applicable to objects on a moving carrier. For example, when the moving carrier refers to an ocean liner which continuously moves, the to-be-monitored area is not fixed. As a result, such monitoring device fails to be applied to a person on the ocean liner for detecting the person crossing a border and falling into the ocean.

Further, for detecting person accidentally falling into the ocean, TW200849152 discloses a rescue system for sailor, wherein a plurality of transmitter are disposed around a ship, and the detection area of each transmitter does not overlap. Also, each person wears a sensor, such that the sensor receives the position signal of the transmitter. When the sensor determines that a person falls into the ocean, the position signal last received is transmitted to the receiver, and the receiver sends out an alarm.

However, the receiver is only capable of knowing the last position of the transmitter, failing to know the correct falling position of the person. Also, the receiver of the monitoring end of the device only passively monitors the sensor. In other words, the receiver is unable to actively detect if the sensor is out of the range of the ship and immediately send out the alarm. Therefore, such device fails to achieve an accurately monitoring function.

SUMMARY OF THE INVENTION

For improving the issues above, the present invention discloses a detection system for detecting a moving object crossing a border. The positioning device sets up a border. With the moving object wearing a sense device in the border range, the positioning device, based on the first position signal of the sense device and the second position signal of the positioning device, determines if the sense device crosses the border and sends out a warning signal accordingly. Therefore, the present invention is applied to a fixed and non-fixed detection area, improving the utility of the device. Also, the positioning device actively and accurately detects the position of the moving object. When the moving object crosses the border, the warning signal is sent out, so as to improve the detection and protection functions.

To achieve the aforementioned objectives, an embodiment of the present invention provides a detection system for detecting a moving object crossing a border, comprising:

a sense device disposed on a moving object, the sense device further including a wireless transmitting module and a first position module, the first position module generating a first position signal based on a position of the sense device; and a positioning device signally connected with the sense device, the positioning device further including a wireless receiving module, a calculating module, a second position module, a detecting module, and a warning module, the wireless receiving module signally connected with the wireless transmitting module and receiving the first position signal, the calculating module setting a border, the second position module generating a second position signal based on the position of the positioning device, the detecting module determining if the sense device crosses the border based on the first position signal and the second position signal, the warning module sending out a warning signal when the sense device is determined as being out of the border.

In an embodiment of the present invention, the positioning device is fixed to a carrier carrying the moving object. The calculating module sets the border after calculating the carrying range. The detecting module, based on the first position signal and the second position signal, calculates the relative positions of the sense device and the positioning device, so as to determine if the sense device is out of the border.

In an embodiment of the present invention, the carrier refers to a ship, and the moving object refers to a person. The sense module is provided with an acceleration sense module. The detecting module receives an acceleration signal of the acceleration sense module, wherein a threshold value is predetermined by the detecting module. When the acceleration signal exceeds the threshold value and the sense device is out of the border, the warning module sends out the warning signal.

In an embodiment of the present invention, the carrier refers to a vehicle, and a plurality of sense devices are included. When one of the sense devices is not situated in the border, the warning module sends out the warning signal.

With the positioning device setting up the border of the carrier, and the sense device disposed on the moving object, the positioning device identifies the relative positions of the sense device and the positioning device based on the first position signal and the second position signal, so as to determine if the sense device is out of the border, and accordingly send out the warning signal. Because that the relative positions of the positioning device and the sense device remain unchanged wherever the carrier moves, the present invention is allowed to achieve the detection function upon a fixed or non-fixed area, improving the application range of the present invention.

Further, with the positioning device actively detecting the position of the moving object, the disadvantage of passively receiving the position signal is improved. Therefore, when the moving object moves out of the border, the warning signal is sent out. Also, by detecting the first position signal of the sense device, the accurate position of the sense device after crossing the border is acquired, such that the detection and protection effects are further improved.

In addition, the acceleration signal generated by the acceleration sense module of the sense device is applied for further ensuring if the moving object crosses the border. When the acceleration signal exceeds the predetermined threshold value and the sense device is out of the border, the moving object is determined as out of the border. By such double checking method, the detection accuracy of the present invention is enhanced.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
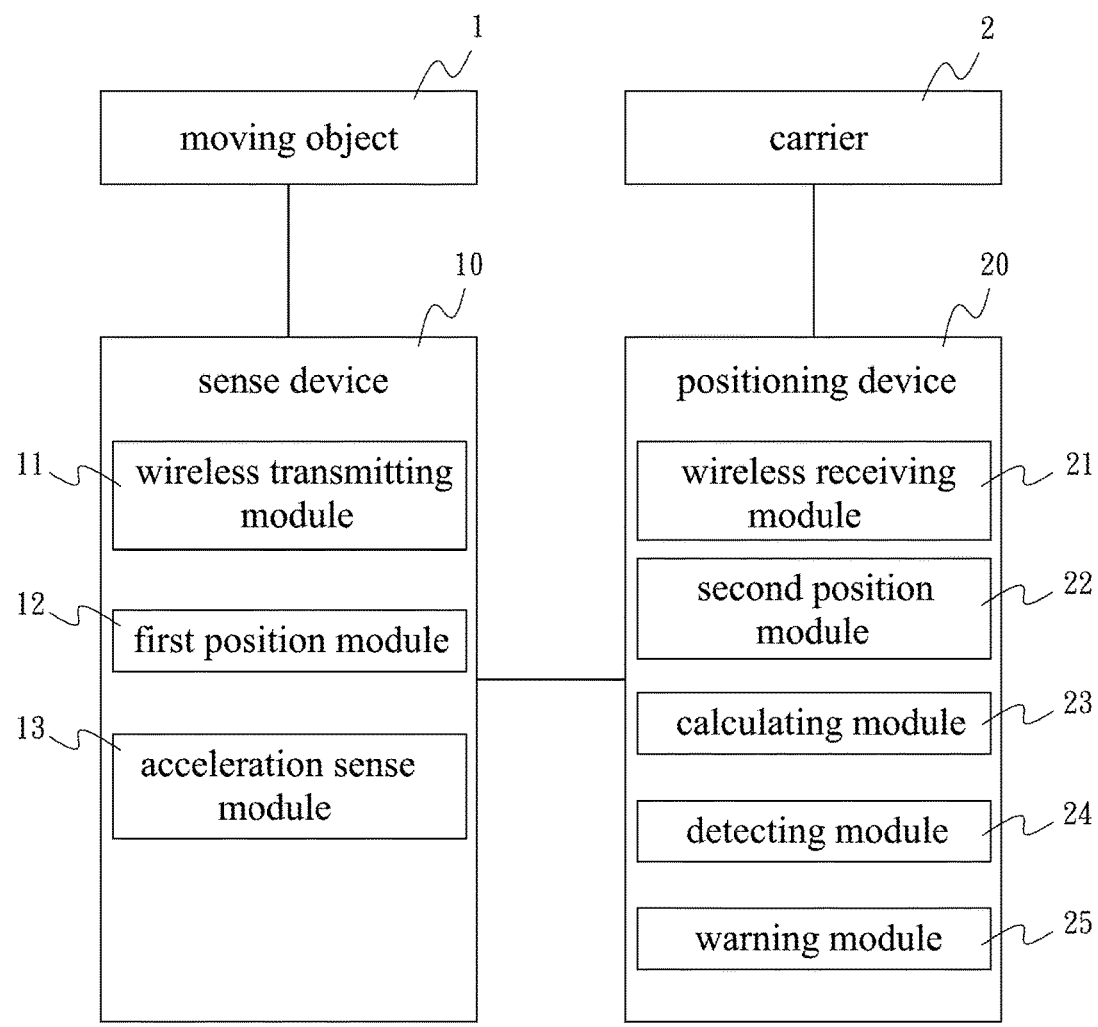
FIG. 1 is a schematic view illustrating the structure of the detection system in accordance with an embodiment of the present invention.
Figure 5:
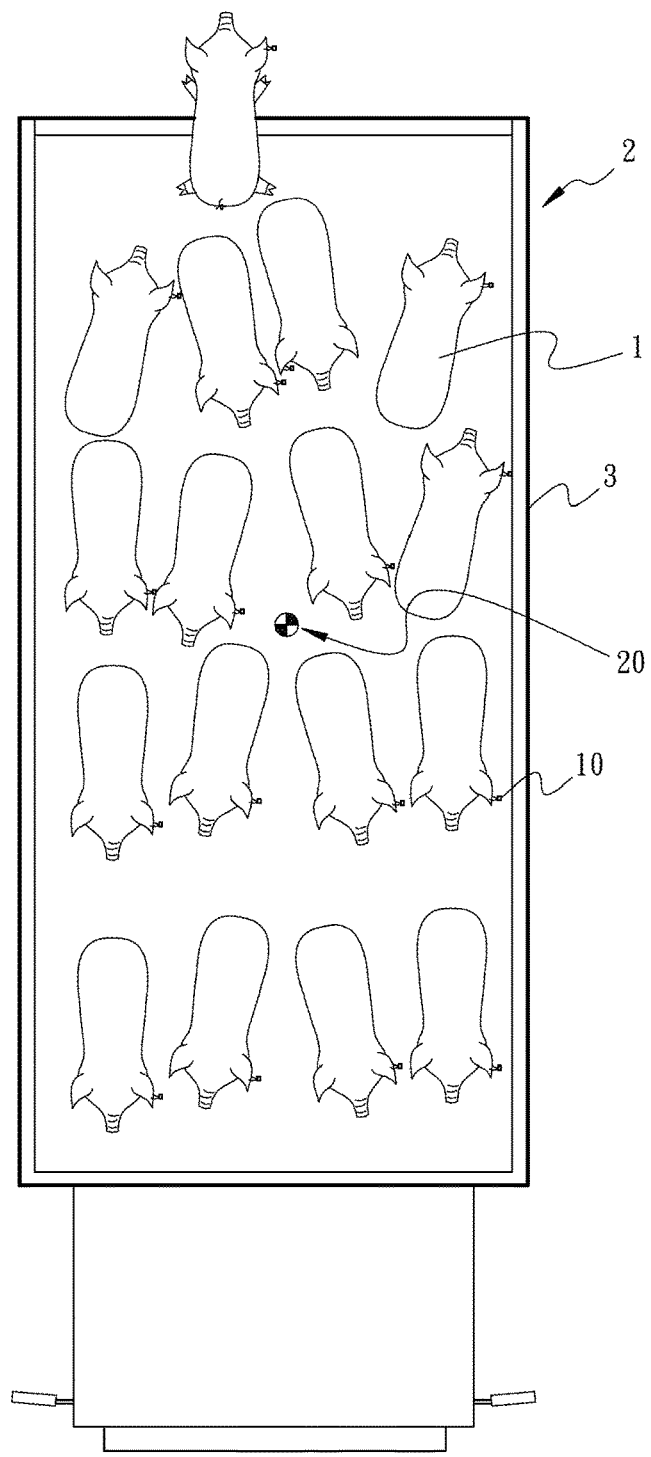
FIG. 5 is a top view of FIG. 4.

Referring to FIG. 1 and FIG. 5, a detection system for detecting a moving object crossing a border comprises a sense device 10 and a positioning device 20.

The sense device 10 is disposed on (such as being worn by) a moving object 1. The moving object 1 is allowed to be a person or an animal. The sense device 10 includes a wireless transmitting module 11 and a first position module 12. The first position module 12 generates a first position signal based on the position of the sense device 10. In an embodiment of the present invention, the first position module 12 refers to a GPS module. The first position signal refers to a coordinate value. The coordinate value refers to a two-dimensional coordinate (x,y).

Also, the wireless transmitting module 11 is allowed to be an antenna, Bluetooth, Wi-Fi, or LPWAN (Low Power Wide Area Network) structure. When the wireless transmitting module 11 is a Bluetooth or wireless internet communication structure (such as Wi-Fi), the radio frequency of the wireless transmitting module 11 ranges from 2.4 GHz to 58 GHz. When the wireless transmitting module 11 is a LPWAN structure, the radio frequency of the wireless transmitting module 11 ranges from 433 MHz to 1.5 GHz. When the wireless transmitting module 11 is an antenna structure, the radio frequency of the wireless transmitting module 11 is able to be adjusted according to different transmission distance, such that the transmission distance of the sense device 10 is not limited.

Additionally, the sense device 10 further includes an acceleration sense module 13 for detecting the motion variation of the moving object 1 during the movement thereof and accordingly generating an acceleration signal. In an embodiment of the present invention, the acceleration sense module 13 refers to an accelerometer.

The positioning device 20 is signally connected with the sense device 10 and disposed on a carrier 2 carrying the moving object 1. The positioning device 20 further includes a wireless receiving module 21 and a second position module 22. The wireless receiving module 21 is signally connected with the wireless transmitting module 11 and receives the first position signal. The second position module 22 generates a second position signal based on the position of the positioning device 20.

Furthermore, the second position module 22 refers to a GPS module. The second position signal refers to a coordinate value. The coordinate value refers to a two-dimensional coordinate (x,y). In an embodiment of the present invention, the positioning device 20 is disposed at a central point of the carrier 2. The central point of the carrier 2 is the intersection point of the central vertical lines of the long side and the short side of the carrier 2. The second position signal is defined as the origin of the coordinates.

The positioning device 20 is provided with a calculating module 23 for calculating the carrying range of the carrier 2, so as to set a border 3. With the positioning device 20 as the two-dimensional central point, the calculating module 23 sets a distance limitation for different angular range from 0 to 360 degrees, respectively, and integrates the area to form a sealed range of the border 3. In an embodiment of the present invention, such border 3 defining process is carried out by a moving object 1 wearing the sense device 10 and moving along the edge of the carrying range of the carrier 2. The first position module 12 of the sense device 10 transmits the first position signals to the calculating module 23, such that the calculating module 23 calculates to identify the relative position and absolute position of the first position signal of the sense device 10 and the second position signal of the positioning device 20. Trace of the movement of the moving object 1 is defined as the border 3, such that the moving object 1 is only allowed to move in the range of border 3 on the carrier 2.

Further, in another embodiment of the present invention, with the positioning device 20 as the central point, the calculating module 23 provides different radius value to each angle, respectively, so as to form a plurality of border points. Subsequently, the calculating module 23 connects the border points to form the border 3. In an embodiment of the present invention, range of angles is adjustable, such as on radius value per 0.1 or 1 angular degree. Therefore, the border 3 with one radius value per 0.1 angular degree is more precise than the border 3 with one radius value per 1 angular degree.

The positioning device 20 is provided with a detecting module 24 and a warning module 25. The detecting module 24 calculates the relative positions of the sense device 10 and the positioning device 20 based on the first position signal and the second position signal, so as to determine if the sense device 10 is out of the border 3. When the sense device 10 crosses out of the border 3, the warning module 25 accordingly sends out a warning signal. In an embodiment of the present invention, the detecting module 24 calculates the relative positions of the first position signal and the second position signal by use of GPS-RTK or VBS-RTK positioning method, so as to determine if the first position signal is out of the border 3.

In addition, the detecting module 24 is able to receive the acceleration signal of the acceleration sense module 13, wherein the detecting module 24 is provided with a threshold value. When the detecting module 24 determines that the acceleration signal exceeds the threshold value and the sense device 10 is out of the border 3, the warning module 25 sends out the warning signal. Also, the threshold value includes an X-axis, Y-axis, and Z-axis values. By this double checking method, the detection accuracy of the present invention is improved.

Figure 2:
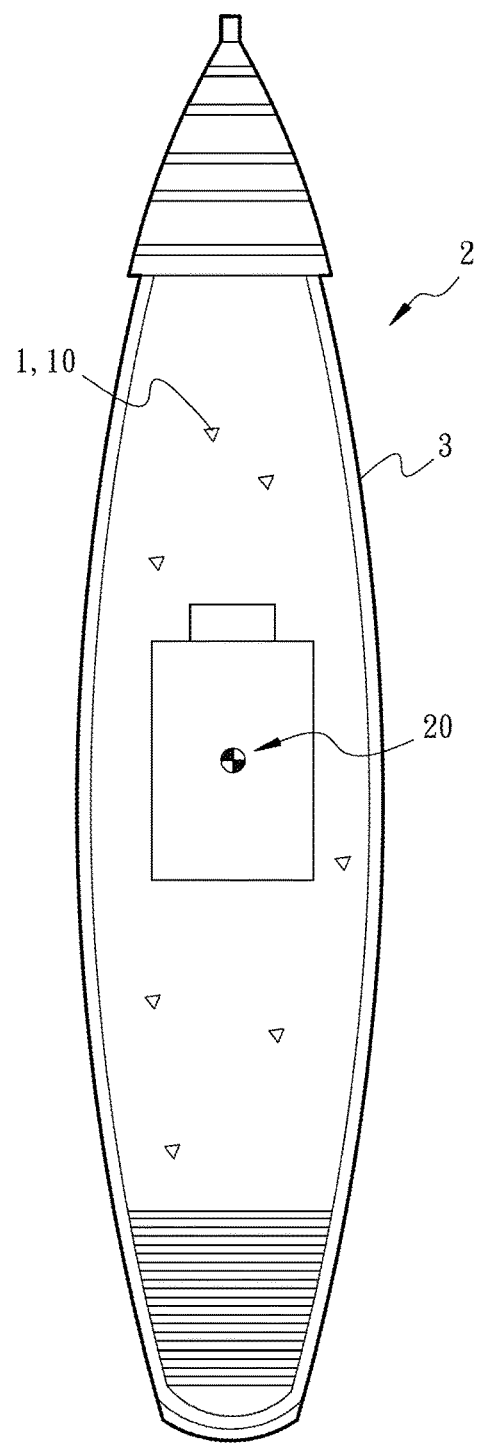
FIG. 2 is a schematic view of an embodiment of the detection system, wherein the carrier refers to a ship and the moving objects are situated inside the border range.
Figure 3:
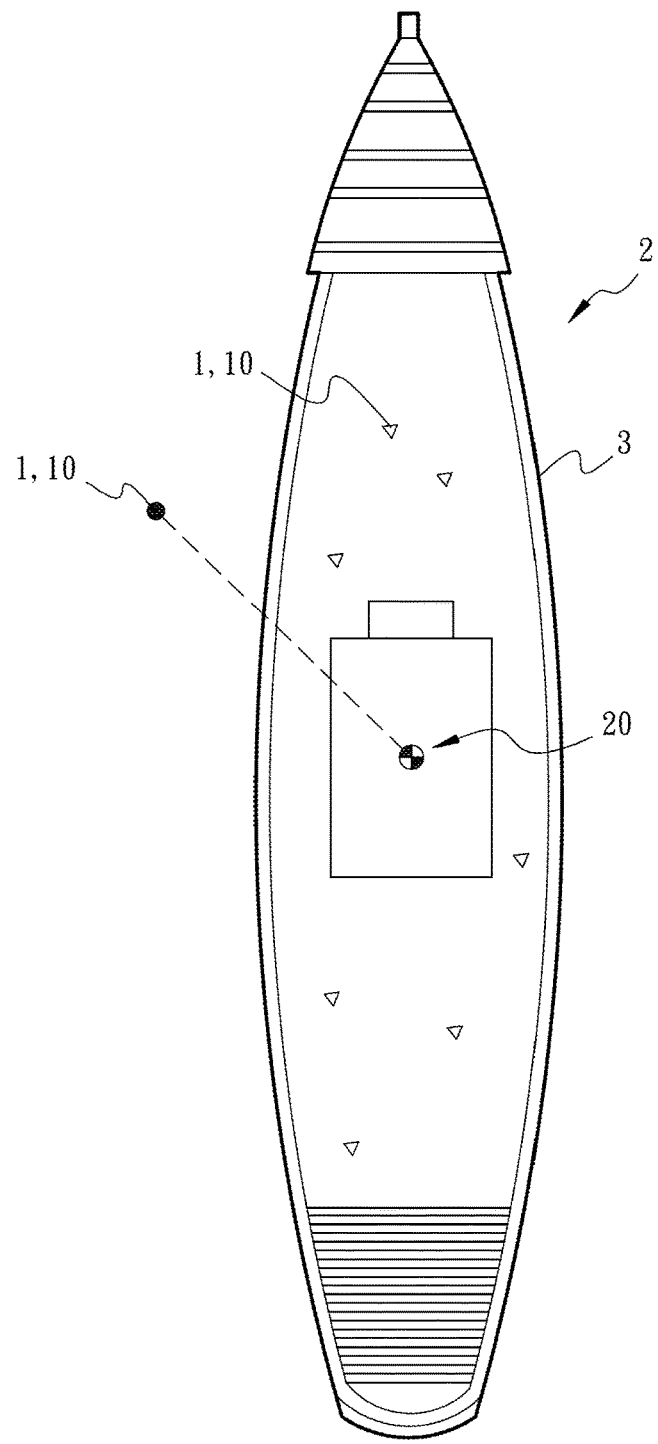
FIG. 3 is a schematic view of the embodiment of FIG. 2, wherein a moving object is out of the border range.

Referring to FIG. 1 to FIG. 3 for the first example, the carrier 2 refers to a ship, and the moving object 1 refers to a person. When the moving object 1 moves on the carrier 2, the acceleration signal from the acceleration sense module 13 does not exceed the threshold value. When the moving object 1 accidentally falls into the ocean from the carrier 2, the acceleration signal from the acceleration sense module 13 drastically varies, such that the acceleration signal exceeds the threshold value. At the same time, the first position signal of the sense device 10 crosses out of the border 3. The warning module 25 immediately sends out the warning signal to ask for rescue, and rescuers are allowed to know the current position of the moving object 1, so as to rescue the moving object 1 in no time.

Figure 4:
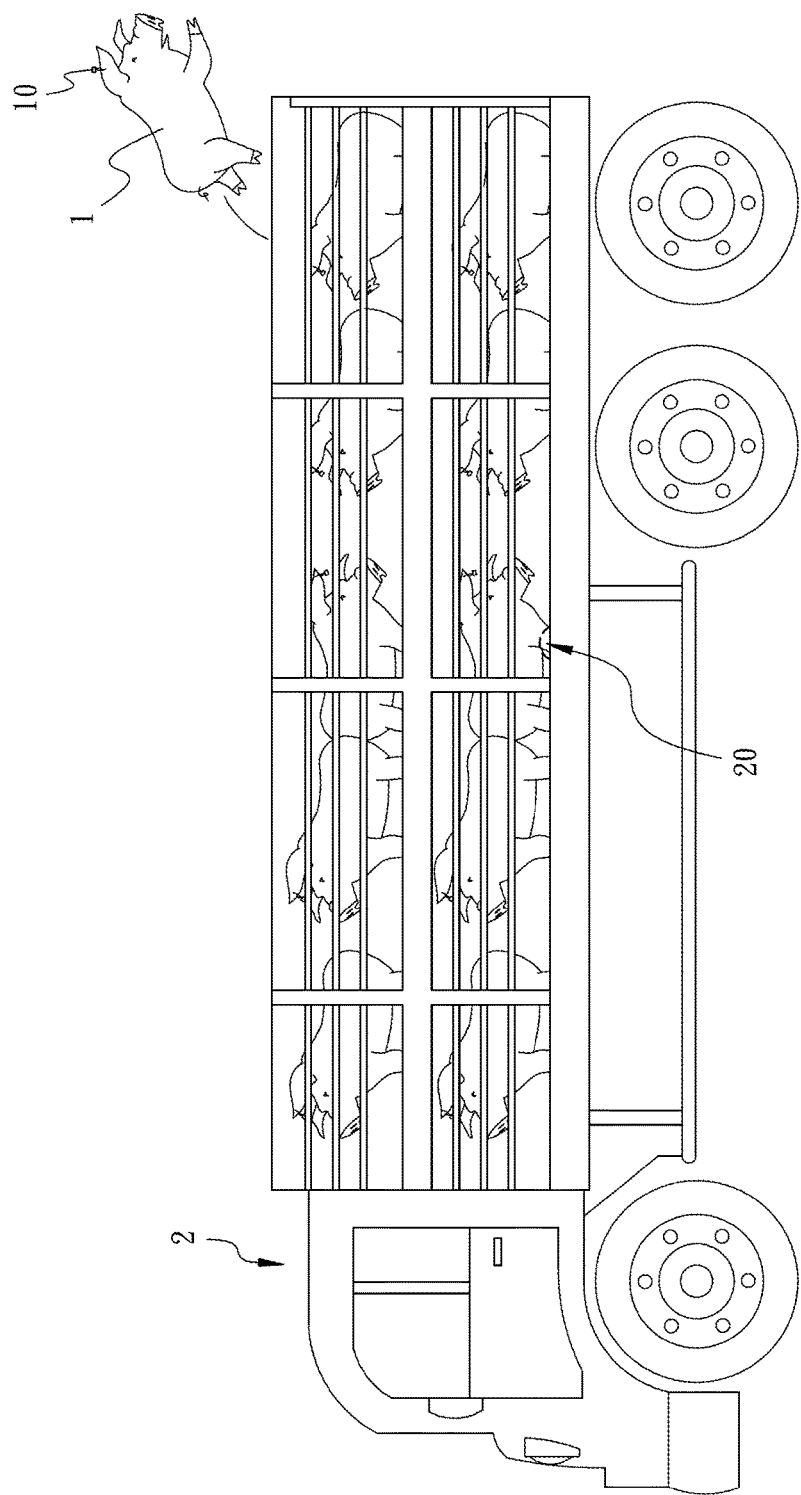
FIG. 4 is a schematic view of another embodiment of the detection system, wherein the carrier refers to a vehicle and a moving object is out of the border range.

Referring to FIG. 1, FIG. 4, and FIG. 5 for the second example, the moving object 1 refers to an animal, and the carrier 2 refers to a vehicle. Each of a plurality of moving objects 1 wears a sense device 10. During the carrier 2 carrying the plurality of moving objects 1, when one of the moving objects 1 jumps out of the carrying area of the carrier 2, the acceleration signal from the acceleration sense module 13 exceeds the threshold value. At the same time, the first position signal of the sense device 10 of the outer moving object 1 is out of the border 3. Therefore, the warning module 25 sends out the warning signal, and the transportation staff are allowed to acquire the current position of the outer moving object 1 according to the first position signal of the sense device 10 thereon.

In another embodiment of the present invention, the carrier 2 refers to a vehicle, and a plurality of sense device 10 are provided on a plurality of moving objects 1. When one of the sense devices 10 is out of the border 3, the warning module 25 sends out the warning signal. For example, during an outdoor teaching, each student is a moving object 1 wearing a sense device 10. When the leader of the team needs to check out the total number of students, the positioning device 20 is used to know that if any moving object 1 is not situated in the border 3. By acquiring the first position signal of the sense device 10 out of the border 3 through the positioning device 20, the position of the outer moving object 1 is efficiently known.

A method of detecting a moving object 1 crossing the border 3 is also included in the present invention, comprising following steps: setting the border; acquiring position; and determining and warning.

During the step of setting the border, the carrier 2 carries the moving object 1, and the range of the border 3 is set according to the carrying range of the carrier 2. In an embodiment of the present invention, the positioning device 20 is disposed at the central point of the carrier 2. With the positioning device 20 as the two-dimensional central point, the calculating module 23 of the carrier 2 sets distance limitations for different angular range from 0 to 360 degrees are set, respectively, and the area is formed into a border 3.

During the step of acquiring position, a first position signal is generated based on the current position of the moving object 1, and a second position signal is generated based on the current position of the carrier 2. In an embodiment of the present invention, the moving object 1 wears a sense device 10, and the first position signal is generated by the first position module 12 of the sense device 10 based on the current position of the moving object 1. The positioning device 20 is disposed at the central point of the carrier 2, and the second position is generated by the second position module 22 of the positioning device 20 based on the current position of the carrier 2.

During the determining and warning step, relative positions of the moving object 1 and the carrier 2 are calculated based on the first position signal and the second position signal to determine if the moving object 1 is out of the border 3. When the moving object 1 is out of the border 3, the warning signal is accordingly sent out. In an embodiment of the present invention, the detecting module 24 of the positioning device 20 calculates the relative positions of the sense device 10 and the positioning device 20 based on the first position signal and the second position signal, so as to determine if the sense device 10 is out of the border 3. When the moving object 1 is out of the one of the border points of the border 3, the warning module 25 sends out the warning signal.

Also, during the determining and warning step, the moving object 1 generates an acceleration signal during the movement. When the acceleration signal exceeds the threshold value and the moving object 1 is out of the border 3, the warning signal is sent out. In an embodiment of the present invention, the detecting module 24 receives the acceleration signal of the acceleration sense module 13, wherein the detecting module 24 is provided with a predetermined threshold value. When the detecting module determines that the acceleration signal exceeds the threshold value, and the sense device 10 is out of the border 3, the warning module 25 sends out the warning signal.

With the sense device 10 disposed on the moving object 1 and the border 3 of the carrier 2 set by the positioning device 20, the relative positions of the sense device 10 and the positioning device 20 are acquired based on the first position signal and the second position signal, such that the user is able to determine if the sense device 10 is situated out of the border 3. Whenever the carrier 2 moves or stays at the same position, the relative positions of the positioning device 20 and the sense device 10 remains unchanged. Therefore, the present invention is suitable for being applied to fixed or non-fixed area monitoring purpose.

Further, the present invention actively detects the current position of the moving object 1 through the positioning device 20. When the moving object 1 crosses the border 3, the warning signal is sent out, and the correct position of the sense device 10 out of the border 3 is accurately acquired by use of the first position signal of the sense device 10. Therefore, detection and protection functions are improved.

Furthermore, when the acceleration signal from the acceleration sense module 13 of the sense device 10 exceeds the threshold values, and the sense device 10 is out of the border 3, the moving object 1 is assured for being out of the border 3. Through such double checking method, possibility of determination errors are reduced, and the detection accuracy is enhanced.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A detection system for detecting a moving object crossing a border, comprising:
    a sense device disposed on a moving object, the sense device further including a wireless transmitting module and a first position module, the first position module generating a first position signal based on a position of the sense device; and
    a positioning device disposed on a carrier which transports the moving object and signally connected with the sense device, the positioning device further including a wireless receiving module, a calculating module, a second position module, a detecting module, and a warning module, the wireless receiving module signally connected with the wireless transmitting module and receiving the first position signal, the calculating module calculating an edge of the carrier to establish a distance limitation for each angle from 0 to 360 degrees around the positioning device, respectively, and based on the distance limitation for each angle around the positioning device, forming the border corresponding to the edge of the carrier, the second position module generating a second position signal based on a position of the positioning device, the detecting module determining if the sense device is outside of the border based on the first position signal and the second position signal, the warning module sending out a warning signal when the sense device is determined as being outside of the border.

2. The detection system of claim 1, wherein the detecting module calculates relative positions of the sense device and the positioning device based on the first position signal and the second position signal, so as to determine if the sense device is outside of the border.

3. The detection system of claim 2, wherein the carrier is a ship and the moving object is a person, the sense device further including an acceleration sense module, the detecting module receiving an acceleration signal generated by the acceleration sense module, and the detecting module provided with a threshold value; when the acceleration signal exceeds the threshold value and the sense device is outside of the border, the warning module sends out the warning signal.

4. The detection system of claim 2, wherein the carrier is a vehicle, and a plurality of sense devices are provided; when one of the sense devices is not within the border, the warning module sends out the warning signal.

5. The detection system of claim 2, wherein the positioning device is disposed at a central point of the carrier; the first position signal and the second position signal are in a form of coordinate values, wherein the second position signal is defined as an origin of the coordinates.

6. The detection system of claim 1, wherein the wireless transmitting module is chosen from a group consisting of Bluetooth, Wi-Fi, and LPWAN structures.

* * * * *